United States Patent [19]
Kawashima et al.

[11] Patent Number: 5,532,194
[45] Date of Patent: Jul. 2, 1996

[54] CORDIERITE GLASS-CERAMIC AND METHOD FOR MANUFACTURING THE SAME

[75] Inventors: Yasuyuki Kawashima; Naoyuki Goto, both of Sagamihara, Japan

[73] Assignee: Kabushiki Kaisya Ohara, Japan

[21] Appl. No.: 409,320

[22] Filed: Mar. 23, 1995

[30] Foreign Application Priority Data

Nov. 18, 1994 [JP] Japan ................................. 6-309713

[51] Int. Cl.$^6$ ................................................. G03C 10/08
[52] U.S. Cl. ........................ 501/9; 501/69; 501/70; 65/33.7
[58] Field of Search ............................. 501/9, 69, 70; 65/33.1, 33.7

[56] References Cited

U.S. PATENT DOCUMENTS

| | | | |
|---|---|---|---|
| 4,304,603 | 12/1981 | Grossman et al. | 501/9 X |
| 4,540,671 | 9/1985 | Kondo et al. | 501/9 |
| 4,764,486 | 8/1988 | Ishihara et al. | 501/69 X |
| 4,897,509 | 1/1990 | Holleran et al. | 501/9 X |
| 5,001,086 | 3/1991 | Carrier et al. | 501/9 |
| 5,013,605 | 5/1991 | Gritz et al. | 501/9 X |

*Primary Examiner*—Karl Group
*Attorney, Agent, or Firm*—Hedman, Gibson & Costigan

[57] ABSTRACT

A cordierite glass-ceramic having a cordierite crystal phase as a predominant crystal phase is obtained by melting a base glass consisting in weight percent of:

| | |
|---|---|
| $SiO_2$ | 38–50% |
| $Al_2O_3$ | 18–30% |
| MgO | 10–20% | the ratio in weight of $Al_2O_3$ to MgO being 1.2 to 2.3

| | |
|---|---|
| $B_2O_3$ | 0–5% |
| CaO | 0–5% |
| BaO | 0–5% |
| SrO | 0–5% |
| ZnO | 0.5–7.5% |
| $TiO_2$ | 4–15% |
| $ZrO_2$ | 0–5% |
| $As_2O_3 + Sb_2O_3$ | 0–2% | and forming the glass and subjecting the glass to heat treatment. This glass-ceramic is suitable for use as a high strength material reqiring high resistivity to heat and impact and as materials requiring a fine processing or a precision processing such as electronic parts, magnetic disk substrates and machine parts.

7 Claims, No Drawings

CORDIERITE GLASS-CERAMIC AND METHOD FOR MANUFACTURING THE SAME

BACKGROUND OF THE INVENTION

This invention relates to a glass-ceramic suitable for use as a high strength material requiring high resistivity to heat and impact and as materials requiring a fine processing or a precision processing such, for example, as electronics parts, magnetic disk substrates and machine parts. The invention relates also to a method for manufacturing such glass-ceramic.

Known in the art are various types of cordierite glass-ceramics obtained by melting and subjecting to a heating treatment a base glass of a $SiO_2$—$Al_2O_3$—$MgO$ system including a nucleating agent. These glass-ceramics generally contain a cordierite crystal phase ($Mg_2Al_4Si_5O_{18}$) as the predominant crystal phase.

There has recently been an increasing tendency toward requirement for the following properties for the above described materials:

(1) The glass-ceramic should have fine crystal grains and have excellent precision processing and excellent fine polishing properties and also have a high mechanical strength.

(2) The glass-ceramic should not substantially contain $Na_2O$ or $K_2O$ ingredient because ion diffusion of these ingredients during the processing of th material tends to change the required properties of the glass-ceramic.

(3) Melting and refining of the base glass should be easy enough to prevent occurrence of cords, foams and inclusions in the glass-ceramic and thereby enable the glass-ceramic to maintain optical homogeneity of a high degree.

(4) The crystallizing temperature of the base glass should be relatively low and thereby a stable mass production of the glass-ceramic can be achieved.

As prior art of cordierite glass-ceramics, for example, Japanese Patent Application Laid-open No. Sho 55-37496 discloses a glass-ceramic obtained by adding $La_2O_3$, $Pr_2O_3$ and $Nd_2O_3$ in a $SiO_2$—$Al_2O_3$—$MgO$ glass including $TiO_2$ as a nucleating agent. U.S. Pat. No. 4,304,603 and Japanese Patent Application Laid-open No. Sho 33-7543 disclose glass-ceramics of a $SiO_2$—$Al_2O_3$—$MgO$ glass including $TiO_2$ as a nucleating agent. Japanese Patent Application Laid-open No. Sho 63-112439 discloses a $SiO_2$—$Al_2O_3$—$MgO$ glass including $TiO_2$ and $ZrO_2$ as nucleating agents.

These prior art cordierite glass-ceramics all require high temeratures ranging from about 1520° C. to 1650° C. for melting base glass materials and, for this reason, it is difficult to obtain a base glass having an excellent homogeneity. These prior art glasses require also high temperatures of about 1100° C. to 1345° C. for crystallization and hence stable mass production of these glass-ceramics is extremely difficult and also it is inevitable in these prior art glass-ceramics that undesirable coarse crystals grow due to crystallization at a high temperature.

It is, therefore, an object of the invention to provide a cordierite glass-ceramic which has excellent melting and crystallizing temperature properties and thereby eliminates the above described disadvantages of the prior art cordierite glass-ceramics while maintaining the above described requirements for the cordierite glass-ceramic.

SUMMARY OF THE INVENTION

Accumulated studies and experiments made by the inventors of the present invention for achieving the above described object of the invention have resulted in the finding, which has led to the present invention, that, by adding ZnO as an essential ingredient and introducing $B_2O_3$, BaO, CaO and SrO in a base glass of a $SiO_2$—$Al_2O_3$—$MgO$ system including $TiO_2$ as a nucleating agent, the melting temperature of the base glass is significantly lowered and the heat treatment of the glass for crystallization can also be made at a significantly lower temperature and a glass-ceramic having fine and uniform crystal grains thereby is produced.

The cordierite glass-ceramic made according to the invention has a cordierite crystal phase as the predominant crystal phase obtained by melting a base glass consisting in weight percent of:

| | |
|---|---|
| $SiO_2$ | 38–50% |
| $Al_2O_3$ | 18–30% |
| MgO | 10–20% | the ratio in weight of $Al_2O_3$ to MgO being

| | |
|---|---|
| $B_2O_3$ | 0–5% |
| CaO | 0–5% |
| BaO | 0–5% |
| SrO | 0–5% |
| ZnO | 0.5–7.5% |
| $TiO_2$ | 4–15% |
| $ZrO_2$ | 0–5% |
| $As_2O_3 + Sb_2O_3$ | 0–2% | and forming the glass and subjecting the glass to heat treatment.

DETAILED DESCRIPTION OF THE INVENTION

The composition of the glass-ceramic of the present invention can be expressed on the oxide basis as in the above described base glass. In the base glass, the above described content ranges of the repsective ingredients have been selected for the reasons stated below. In the following description, the content ranges of the respective ingredients are expressed in weight percent.

The $SiO_2$ ingredient is a very important ingredient for producing a cordierite ($Mg_2Al_4Si_5O_{18}$) crystal as the predominant crystal phase by heat treating the base glass. If the amount of this ingredient is below 38%, the crystal growing in the glass-ceramic is instable whereas if the amount exceeds 50%, melting of the base glass becomes difficult. A particularly preferable range of this ingredient has been found to be 42% to 47%.

The $Al_2O_3$ ingredient is also a very important ingredient for producing the cordierite crystal by heat treating the base glass. If the amount this ingredient is below 18%, growing of the cordierite crystal is difficult and melting of the base glass becomes also difficult. If the amount of this ingredient exceeds 30%, melting of the base glass becomes also difficult and the property against devitrification is deteriorated. A particularly preferable range of this ingredient is 22% to 27%.

The MgO ingredient is also a very important ingredient for producing the cordierite crystal as the predominant crystal phase. If the amount of this ingredient is below 10%, growing of the cordierite crystal becomes difficult and melting of the base glass becomes also difficult. If the amount of this ingredient exceeds 20%, melting of the base glass becomes difficult and the property against devitrification is deteriorated. A particularly preferable range of this ingredient is 13% to 18%. For obtaining a desired crystal phase, it is necessary to maintain the ratio in weight of $Al_2O_3$ to MgO at 1.2 to 2.3. If this ratio is below 1.2, it becomes difficult to produce a desired cordierite crystal whereas if this ratio exceeds 2.3, melting of the base glass becomes difficult.

The $TiO_2$ ingredient is indispensable as the nucleating agent. If the amount of this ingredient is below 4%, a desired crystal cannot be obtained whereas if the amount of this ingredient exceeds 15%, the property against devitrification is deteriorated. A particularly preferable range of this ingredient is 8% to 12%.

The $ZrO_2$ ingredient is an effective ingredient as the nucleating agent. If, however, the amount of this ingredient exceeds 5%, The crsystal obtained tends to become coarse and therefore it becomes difficult to obtain uniformly fine crystal grains and melting of the base glass becomes also difficult. The upper limit of addition of this ingredient should preferably be 3%.

The ZnO ingredient is an important ingredient which improves melting property of the base glass. If the amount of this ingredient is below 0.5%, melting of the base glass becomes difficult and it becomes also difficult to obtain a desired crystal phase. If the amount of this ingredient exceeds 7.5%, the property against devitrification is deteriorated and it becomes also difficult to obtain a desired crystal phase. A particulary preferable range of this ingredient is 1% to 4%.

The CaO, BaO, SrO and $B_2O_3$ ingredients are effective for improving the melting property of the base glass, preventing occurrence of partial opaqueness of the glass during forming of the molten glass and preventing the crystal grown from becoming coarse. If the total amount of one or more ingredients of CaO, BaO, SrO and $B_2O_3$ is below 0.5%, these technical effects cannot be obtained sufficiently whereas if the amount of each of these ingredients exceeds 5%, growing of a desired crystal phase becomes difficult and, moreover, the crystal becomes coarse and uniformly fine crystal grains cannot be obtained. The upper limit of addition of each of these ingredients should preferably be 3%.

The $As_2O_3$ and/or $Sb_2O_3$ ingredient may be added as a refining agent in melting of the glass. It will suffice if the total amount of one or both of these ingredients is 2%.

In addition to the above described ingredients, $La_2O_3$, $Gd_2O_3$, $CeO_2$ and $Y_2O_3$ may be added up the total amount of 3% for one OF more of these ingrediens and $Fe_2O_3$, $Cr_2O_3$, $MnO_2$ and CuO may be added as a coloring agent up to the total amount of 3% for one or more of these ingredients, respectively within the range in which desired properties of the glass-ceramic according to the invention will not be impaired.

For manufacturing the cordierite glass-ceramic of the invention, the base glass having the above described composition is molten and, after being formed to a predetermined form and annealed, the formed glass is subjected to primary heat treatment at a temperature between 700° C. and 800° C. and subsequently to secondary heat treatment at a temperature between 900° C. and 1000° C.

Then, the glass-ceramic obtained by the heat treatments is lapped and polished in a known manner to a polished surface having surface roughness (Ra) of 5 Å to 50 Å.

EXAMPLES

Examples of the cordierite glass-ceramic according to the invention will now be described in comparison with comparative examples.

Table 1 shows examples (No. 1 to No. 10) of the cordierite glass-ceramic according to the invention and comparative examples (No. 1 to No. 3) of the prior art cordierite glass-ceramics together with results of measurements of melting temperature of the base glass, temperatures and time of the primay and secondary heat treatments after melting and forming of the base glass, crystal phases, diameters of grown crystal grains and surface roughness (Ra) after lapping and polishing.

TABLE 1

| | Examples No | | | | (weight %) |
|---|---|---|---|---|---|
| | 1 | 2 | 3 | 4 | |
| $SiO_2$ | 43.0 | 45.0 | 50.0 | 47.0 | |
| $Al_2O_3$ | 27.0 | 24.0 | 24.0 | 21.0 | |
| $B_2O_3$ | 1.0 | 2.0 | | | |
| MgO | 13.0 | 15.0 | 15.0 | 17.0 | |
| CaO | | 1.0 | | | |
| BaO | 1.0 | 0.5 | | 0.5 | |
| ZnO | 4.0 | 2.5 | 0.5 | 2.0 | |
| SrO | | | 0.5 | | |
| $TiO_2$ | 10.0 | 8.5 | 9.0 | 11.5 | |
| $ZrO_2$ | | | | | |
| $As_2O_3$ | | 1.0 | 1.0 | | |
| $Sb_2O_3$ | 1.0 | | | 1.0 | |
| Melting temperature (°C.) | 1450 | 1450 | 1450 | 1450 | |
| Temperature of primary heat treatment (°C.) | 750 | 800 | 750 | 800 | |
| Time (hr) | 5 | 5 | 5 | 5 | |
| Temperature of secondary heat treatment (°C.) | 1000 | 900 | 900 | 900 | |
| Time (hr) | 3 | 5 | 5 | 5 | |
| Crystal phase | α-cordierite | μ-cordierite | μ-cordierite | μ-cordierite | |
| Diameter of grain (μm) | 4.8 | 1.2 | 1.8 | 2.1 | |
| Ra (Å) | 31 | 9 | 16 | 20 | |

| | Examples No | | | |
|---|---|---|---|---|
| | 5 | 6 | 7 | 8 |
| $SiO_2$ | 44.0 | 46.5 | 47.0 | 44.0 |
| $Al_2O_3$ | 24.0 | 24.0 | 28.0 | 25.0 |
| $B_2O_3$ | 1.0 | | | 1.0 |
| MgO | 16.0 | 15.0 | 12.0 | 13.0 |
| CaO | 1.0 | | | 0.5 |
| BaO | | 0.5 | 0.5 | |
| ZnO | 1.5 | 2.5 | 2.5 | 5.5 |
| SrO | 0.5 | | | |
| $TiO_2$ | 11.5 | 10.0 | 7.0 | 10.0 |
| $ZrO_2$ | | | 2.0 | |
| $As_2O_3$ | 1.0 | 1.0 | 1.0 | |
| $Sb_2O_3$ | | | | 1.0 |
| Melting temperature (°C.) | 1450 | 1450 | 1450 | 1450 |
| Temperature of primary heat treatment (°C.) | 800 | 800 | 800 | 700 |
| Time (hr) | 5 | 5 | 5 | 5 |
| Temperature of secondary heat treat- | 900 | 900 | 900 | 950 |

TABLE 1-continued

| ment (°C.) | | | | |
|---|---|---|---|---|
| Time (hr) | 5 | 5 | 5 | 3 |
| Crystal phase | μ-cordierite | μ-cordierite | μ-cordierite | α-cordierite |
| Diameter of grain (μm) | 1.4 | 0.9 | 2.4 | 3.7 |
| Ra (Å) | 10 | 8 | 21 | 28 |

| | Examples No. | |
|---|---|---|
| | 9 | 10 |
| $SiO_2$ | 50.0 | 44.0 |
| $Al_2O_2$ | 21.0 | 24.0 |
| $B_2O_3$ | 1.0 | 2.5 |
| MgO | 12.0 | 15.0 |
| CaO | 0.5 | 0.5 |
| BaO | 1.0 | |
| ZnO | 2.5 | 2.5 |
| SrO | | 0.5 |
| $TiO_2$ | 11.0 | 9.0 |
| $ZrO_2$ | | 1.0 |
| $As_2O_3$ | 1.0 | 1.0 |
| $Sb_2O_3$ | | |
| Melting temperature (°C.) | 1450 | 1450 |
| Temperature of primary heat treatment (°C.) | 800 | 750 |
| Time (hr) | 5 | 5 |
| Temperature of secondary heat treatment (°C.) | 900 | 900 |
| Time (hr) | 5 | 5 |
| Crystal phase | α-cordierite | α-cordierite |
| Diameter of grain (μm) | 3.2 | 7.0 |
| Ra (Å) | 25 | 34 |

| | Comparative examples No. | | |
|---|---|---|---|
| | 1 | 2 | 3 |
| $SiO_2$ | 33.0 | 49.9 | 45.2 |
| $Al_2O_3$ | 23.0 | 23.2 | 29.5 |
| $B_2O_3$ | | | |
| MgO | 9.0 | 15.8 | 10.4 |
| CaO | | | |
| BaO | | | |
| ZnO | | | |
| SrO | | | |
| $TiO_2$ | 18.0 | 10.7 | 10.8 |
| $ZrO_2$ | | | |
| $As_2O_3$ | 0.4 | 0.4 | |
| $Sb_2O_3$ | | | |
| | $CeO_3$ 8.5 | | $K_2O$ 1.8 |
| | $La_2O_3$ 3.9 | | F 2.3 |
| | $Pr_2O_3$ 2.1 | | |
| | $Nd_2O_3$ 2.1 | | |
| Melting temperature (°C.) | 1550 | 1500 | 1650 |
| Temperature of primary heat treatment (°C.) | 900 | 950 | 900 |
| Time (hr) | 3 | 6 | 3 |
| Temperature of secondary heat treatment (°C.) | 1200 | 1300 | 1100 |
| Time (hr) | 6 | 12 | 6 |
| Crystal phase | h-cordierite | h-cordierite | h-cordierite |
| Diameter of grain (μm) | 14.5 | 15.0 | 11.3 |
| Ra (Å) | 74 | 82 | 69 |

The measurement of the melting condition was made by preparing and mixing materials including oxides, carbonates and nitrates so as to obtain glass of 2500 grams, putting the mixed materials in a platinum crucible in a furnace temperature of which had previously been adjusted depending upon the melting condition due to difference the glass composition, stirring and melting the materials and visually observing the defoamed state of the glass. The glass thus obtained was subjected to the two-stage heat treatment for producing the glass-ceramic. An X-ray test of the glass-ceramic obtained has revealed that the glass-ceramic contains cordierite as the predominant crystal phase and also, as sub crystal phases, $MgAl_2Ti_3O_{10}$, $Mg_4Al_2Ti_9O_{25}$, enstatite (Mg $SiO_3$), beta-quartz solid-solution and cornelbine (MgO·$Al_2O_3$·$SiO_2$).

For measuring the surface roughness (Ra), a specimen was made by lapping the surface of the above described glass-ceramic for about 10 to 20 minutes with lapping grains of cerium oxide having an average grain diameter ranging from 9 μm to 12 μm and then polishing the surface of the glass-ceramic for about 30 to 40 minutes with polishing grains of cerium oxide having an average grain diameter ranging from 1 μm to 2 μm.

As shown in Table 1, melting of the base glass in the examples of the invention is achieved at a temperature of 1450° C. or below and this melting condition is advantageous over the comparative examples in which the base glasses are molten at temperatures ranging from 1500° C. to 1650° C. because, in the melting condition of the examples of the invention, loss of volatile ingredients such as $B_2O_3$ is relatively small and homogeneity of the obtained glass-ceramic is by far superior to the glass-ceramics of the comparative examples.

Moreover, in the comparative examples, the heat treatment must be performed at high temperature ranges of 900° C.–950° C. for the primary heat treatment and 1100° C.–1300° C. for the secondary heat treatment whereas in the examples of the invention, the heat treatment can be performed at lower temperature ranges of 700° C.–800° C. for the primary heat treatment and 900° C.–1000° C. for the secondary heat treatment whereby a stable large scale production of the cordierite glass-ceramic can be realized. As to the diameter of crystal grain, the glass-ceramics of the comparative examples have coarse grains with a diameter of 11.0 μm or over. In contrast, the glass-ceramics of the examples of the present invention have unformly fine grains having a diameter of 10 μm or less. The glass-ceramics of the comparative examples exhibit surface roughness (Ra) of 60 Å or over whereas the glass-ceramics of the examples of the present invention exhibit surface roughness of 50 Å or less which enables precision processing and precision polishing.

What is claimed is:

1. A cordierite glass-ceramic having a cordierite crystal phase comprising crystal grains as a predominant crystal phase obtained by melting a base glass consisting in weight percent of:

| $SiO_2$ | 42–47% |
|---|---|
| $Al_2O_3$ | 18–30% |
| MgO | 10–20% | the ratio in weight of $Al_2O_3$ to MgO being 1.2 to 2.3

| $B_2O_3$ | 0–5% |
|---|---|
| CaO | 0–5% |
| BaO | 0–5% |
| SrO | 0–5% |
| ZnO | 0.5–7.5% |
| $TiO_2$ | 8–12% |
| $ZrO_2$ | 0–5% |
| $As_2O_3 + Sb_2O_3$ | 0–2% | and forming the glass and subjecting the glass to heat treatment.

2. A cordierite glass-ceramic as defined in claim 1 wherein the base glass consists in weight percent of:

| SiO$_2$ | 42–47% |
|---|---|
| Al$_2$O$_3$ | 22–27% |
| MgO | 13–18% | the ratio in weight of Al$_2$O$_3$ to MgO being 1.2 to 2.3

| B$_2$O$_3$ | 0–3% |
|---|---|
| CaO | 0–3% |
| BaO | 0–3% |
| SrO | 0–3% |
| ZnO | 1–4% |
| TiO$_2$ | 8–12% |
| ZrO$_2$ | 0–3% |
| As$_2$O$_3$ + Sb$_2$O$_3$ | 0–2%. |

3. A cordierite glass-ceramic as defined in claim 1 wherein the diameter of said crystal grains is within the range of 0.5 μm–10 μm and the surface roughness (Ra) of a lapped and polished surface is within the range of 5 Å to 50 Å.

4. A cordierite glass-ceramic as defined in claim 2 wherein the diameter of said crystal grains is within the range of 0.5 μm–10 μm and the surface roughness (Ra) of a lapped and polished surface is within the range of 5 Å to 50 Å.

5. A method for manufacturing a cordierite glass-ceramic comprising the steps of:

melting a base glass consisting in weight percent of:

| SiO$_2$ | [38–50%] 42–47% |
|---|---|
| Al$_2$O$_3$ | 18–30% |
| MgO | 10–20% | the ratio in weight of Al$_2$O$_3$ to MgO being 1.2 to 2.3

| B$_2$O$_3$ | 0–5% |
|---|---|
| CaO | 0–5% |
| BaO | 0–5% |
| SrO | 0–5% |
| ZnO | 0.5–7.5% |
| TiO$_2$ | [4–15%] 8–12% |
| ZrO$_2$ | 0–5% |
| As$_2$O$_3$ + Sb$_2$O$_3$ | 0–2% | at a temperature of 1500° C. or below;

forming the molten glass to a form and annealing the formed glass;

subjecting the glass to a primary heat treatment under a temperature within the range of 700° C.–800° C.;

and then subjecting the glass to a secondary heat treatment under a temperature within the range of 900°–1000° C.

6. A method for manufacturing a cordierite glass-ceramic comprising the steps of:

melting a base glass consisting in weight percent of:

| SiO$_2$ | 42–47% |
|---|---|
| Al$_2$O$_3$ | 22–27% |
| MgO | 13–18% | the ratio in weight of Al$_2$O$_3$ to MgO being 1.2 to 2.3

| B$_2$O$_3$ | 0–3% |
|---|---|
| CaO | 0–3% |
| BaO | 0–3% |
| SrO | 0–3% |
| ZnO | 1–4% |
| TiO$_2$ | 8–12% |
| ZrO$_2$ | 0–3% |
| As$_2$O$_3$ + Sb$_2$O$_3$ | 0–2% | at a temperature of 1500° C. or below;

forming the molten glass to a form and annealing the formed glass;

subjecting the glass to a primary heat treatment under a temperature within the range of 700° C.–800° C.;

and then subjecting the glass to a secondary heat treatment under a temperature within the range of 900°–1000° C.

7. A cordierite glass-ceramic having a cordierite crystal phase comprising crystal grains as a predominant crystal phase said glass-ceramic being obtained by a process which consists essentially of the step of melting a base glass consisting in weight percent of:

| SiO$_2$ | 42–47% |
|---|---|
| Al$_2$O$_3$ | 18–30% |
| MgO | 10–20% | the ratio in weight of Al$_2$O$_3$ to MgO being 1.2 to 2.3

| B$_2$O$_3$ | 0–5% |
|---|---|
| CaO | 0–5% |
| BaO | 0–5% |
| SrO | 0–5% |
| ZnO | 0.5–7.5% |
| TiO$_2$ | 8–12% |
| ZrO$_2$ | 0–5% |
| As$_2$O$_3$ + Sb$_2$O$_3$ | 0–2% | at a temperature of 1500° C. or below;

forming the glass and subjecting the glass to a primary heat treatment at a temperature within the range of 700° C.–800° C.; and then subjecting the glass to a secondary heat treatment at a temperature within the range of 900°–1000° C.

* * * * *